(12) United States Patent
Lindblom et al.

(10) Patent No.: US 6,602,028 B1
(45) Date of Patent: Aug. 5, 2003

(54) SUPPORT PAD FOR A DEEP HOLE DRILL

(75) Inventors: Stefan Lindblom, Gävle (SE); Mattias Vanberg, Järbo (SE)

(73) Assignee: Sandvik Aktiebolag, Sandviken (SE)

( * ) Notice: Subject to any disclaimer, the term of this patent is extended or adjusted under 35 U.S.C. 154(b) by 0 days.

(21) Appl. No.: 10/018,779

(22) PCT Filed: Jun. 14, 2000

(86) PCT No.: PCT/SE00/01233
§ 371 (c)(1),
(2), (4) Date: Mar. 5, 2002

(87) PCT Pub. No.: WO00/78487
PCT Pub. Date: Dec. 28, 2000

(30) Foreign Application Priority Data

Jun. 21, 1999 (SE) .................................. 9902355

(51) Int. Cl.[7] .......................... B23B 41/02; B23B 51/00
(52) U.S. Cl. .................... 408/83; 175/399; 408/200; 408/705
(58) Field of Search .................... 408/83, 705, 200, 408/199, 114, 226, 713, 715, 79, 80, 81, 82; 175/406, 408

(56) References Cited

U.S. PATENT DOCUMENTS

| | | | | | |
|---|---|---|---|---|---|
| 3,751,177 | A | * | 8/1973 | Faber | 408/200 |
| 4,133,399 | A | * | 1/1979 | Herrmann | 175/384 |
| 4,571,130 | A | * | 2/1986 | Kress et al. | 408/143 |
| 4,596,498 | A | * | 6/1986 | Kress | 408/83 |
| 5,125,772 | A | * | 6/1992 | Kress | 408/57 |
| 5,238,335 | A | * | 8/1993 | Nomura | 408/59 |
| 5,328,304 | A | * | 7/1994 | Kress et al. | 408/83 |
| 5,551,812 | A | * | 9/1996 | Basteck | 408/199 |
| 5,697,737 | A | * | 12/1997 | Danielsson et al. | 408/83 |
| 5,921,727 | A | * | 7/1999 | Depperman | 408/144 |

* cited by examiner

*Primary Examiner*—Steven C. Bishop
(74) *Attorney, Agent, or Firm*—Burns, Doane, Swecker & Mathis, LLP

(57) ABSTRACT

An element which defines a support pad and/or a guide bar adapted to be mounted in a seat of a cutter head of a deep hole drill comprises a body which defines a longitudinal direction and a cross-direction. The body includes an inner mounting side and an opposing outer side. The outer side includes a contact surface which is adapted to engage a wall of a hole being drilled. The outer side also includes a countersink extending across the outer side in a direction transversely of the longitudinal direction. An edge of the contact surface facing toward a center of the body forms an angle with the longitudinal direction in the range of 55°±10°.

10 Claims, 3 Drawing Sheets

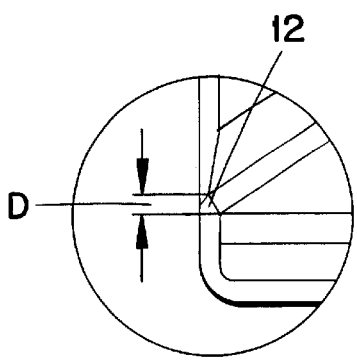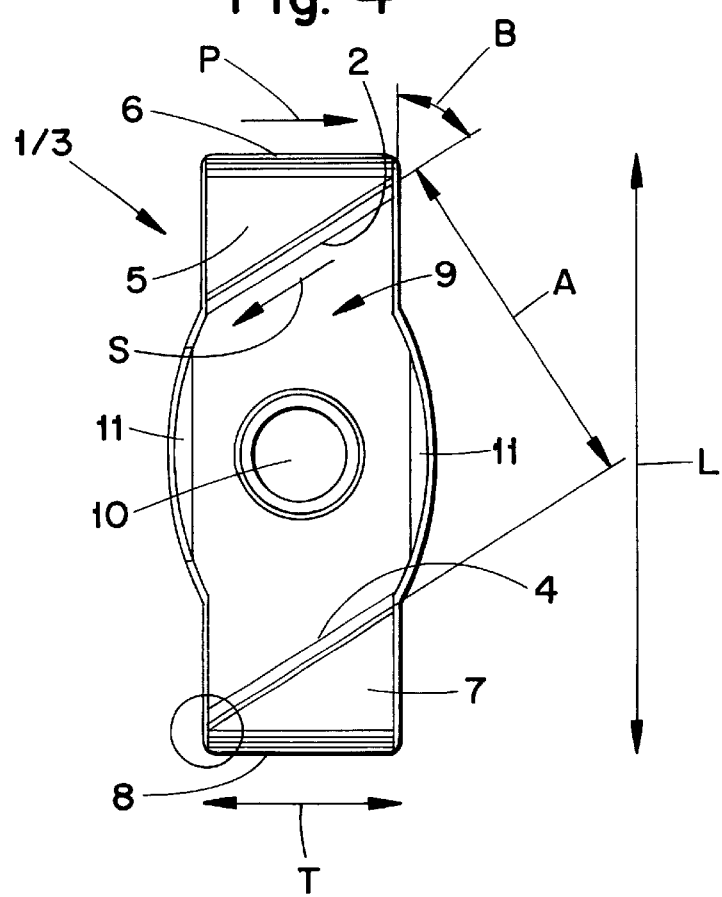

SUPPORT PAD FOR A DEEP HOLE DRILL

TECHNICAL FIELD OF THE INVENTION

The present invention relates to a support pad/guide bar, which is intended to be mounted in a seat on the cutter head of a deep hole drill, said support pad/guide bar having a longitudinal direction and a cross-direction, and that the support pad/guide bar has, at least one contact surface, on the side thereof turned outwards in the mounted state, which is intended to cooperate with the hole wall. The two most common systems in deep hole drilling are presently the STS (Single Tube System) system and the Ejector system, at which the support pad/guide bar according to the present invention may be used in connection with a deep hole drill which relates to both these systems.

PRIOR ART

In deep hole drilling in a workpiece, a commonly occurring problem is that the support pads and guide bars, which are arranged on the cutter head, are subjected to the formation of crack during the deep hole drilling. The reason for this is that the support pads/guide bars are normally made of solid cemented carbide, whereby said support pads/guide bars may be exchangeably fixed on the cutter head or in various ways connected by soldering to the cutter head. During the drilling process, the support pads/guide bars are exposed to high temperatures by the fact that the friction against the hole wall may be high. However, most often so that the entire support pad/guide bar does not abut against the hole wall, and therefore only a part of said support pad/guide bar is exposed to said friction. The cooling liquid flowing between the cutter head and the bore hole will not be in contact with the support pad/guide bar in the areas where abutment takes place between the support pad/guide bar and the hole wall to a sufficient extent. As a consequence of these interacting circumstances, i.e. high friction and deficient cooling, cracks arise in the support pads/guide bars, which reduces the service life of said support pads/guide bars.

AIMS AND FEATURES OF THE INVENTION

The present invention has as its aim the definition of a support pad/guide bar of the kind defined in the introduction, which is so designed that a substantially improved cooling of the support pad/guide bar is achieved. Another aim of the present invention is to increase the service life of the support pad/guide bar by reducing the occurrence of cracks in the support pad/guide bar.

The aims of the invention are realized by means of an element, i.e., a support pad or a guide bar, which is adapted to be mounted in a seat of a cutter head of a deep hole drill. The element comprises a body which defines a longitudinal direction and a cross-direction. The body includes an inner mounting side and an opposing outer side. The outer side includes a contact surface adapted to engage a wall of a hole being drilled. The outer side also includes a countersink which extends across the outer side in a direction transversely of the longitudinal direction, wherein an edge of the contact surface facing toward a center of the body forms an angle with the longitudinal direction in the range of 55 plus or minus 100°.

BRIEF DESCRIPTION OF THE DRAWING

Below embodiments of the present invention will be described, reference being made to the accompanying drawings, where:

FIG. 4 shows a planar view of a support pad/guide bar according to FIG. 2;

FIG. 5 shows in a larger scale a detail of the support pad/guide bar according to FIG. 4;

DESCRIPTION OF PREFERRED EMBODIMENTS OF THE INVENTION

Figure 1:
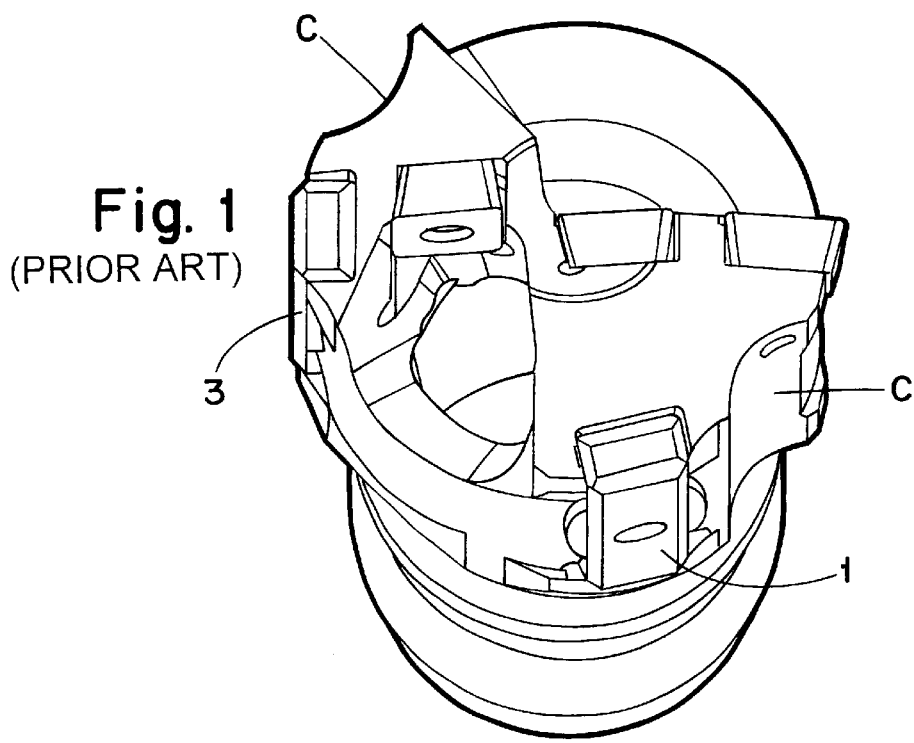
FIG. 1 shows a perspective view obliquely from above of a deep hole drill, which is equipped with a support pad and a guide bar.

The cutter head of a deep hole drill illustrated in FIG. 1 is equipped with a support pad 1 as well as a guide bar 3. The support pad 1 and the guide bar 3 are received in seats and anchored in said seats by means of [the principle for indexable inserts. i.e. by means of] a screw (not visible in FIG. 1) which extends through a hole in the support pad 1 /guide bar 3 and anchors this in the appurtenant seat thanks to the screw extending into a threaded hole in the cutter head.

Furthermore, the cutter head is, in the usual way, equipped with a cutting insert and provided with openings and an inner channel for removal of chips, which are generated at drilling. However, these details are not described further in the present patent application since they do not constitute any part of the invention in question.

Figure 2:
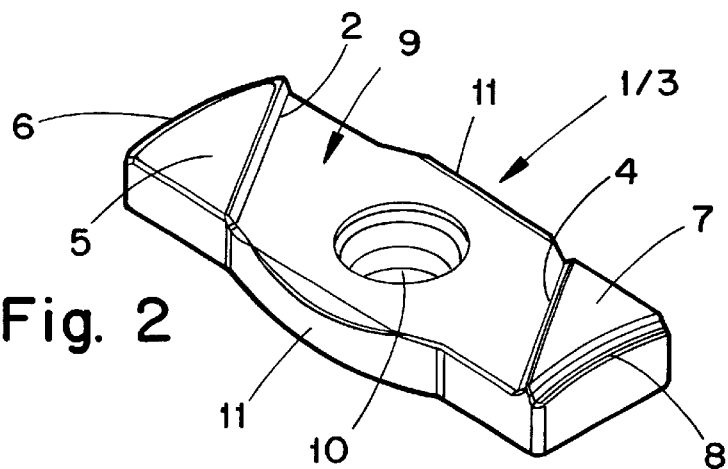
FIG. 2 shows a perspective view of a support pad/guide bar according to the present invention.

The support pad 1/guide bar 3 (shown in FIGS. 2–4) is of a generally parallelepipedical basic shape and a generally rectangular shape in planar view, see FIG. 4. The support pad 1/guide bar 3 has a longitudinal direction L along a long side of the support pad 1/guide bar 3 and a cross-direction T along a short side of the support pad 1/guide bar 3. The support pad 1/guide bar 3 is, on the side turned outwards in the mounted position in the cutter head, provided with two, in planar view, triangular contact surfaces 5 and 7, which between themselves define a countersink 9, which in the shown embodiment, by virtue of the triangular shape of the contact surfaces 5, 7, extends diagonally across the support pad 1/guide bar 3. The limiting edges 2, 4 of the contact surfaces 5, 7 turned towards the center of the support pad 1/guide bar 3 are in the main straight.

Figure 3:
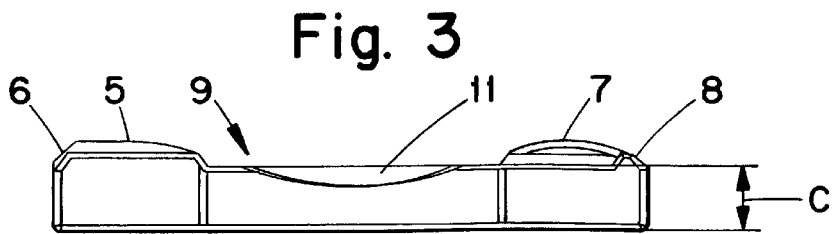
FIG. 3 shows a side view of a support pad/guide bar according to FIG. 2.

The contact surfaces 5, 7, which in the mounted state of the support pad 1/guide bar 3 are turned outwards, are convex, as may be most clearly seen in FIG. 3. Thus, said convex contact surfaces 5, 7 have a certain radius of curvature, and in this connection it should be pointed out that normally support pads 1/guide bars 3 are not made for each drill diameter, but support pads 1/guide bars with same dimensions are used on all drills within a certain drill diameter range, the radius of curvature of the support pad 1/guide bar 3 corresponding to the radius of curvature of the cutter head of the drill with the smallest drill diameter in the range in question. Thus, this means that the radius of curvature of the support pad 1/guide bar 3 and the radius of curvature of the cutter head do not always correspond exactly. The interior contact surface of the support pad 1/guide bar 3, i.e., the surface which is not shown in FIGS. 2–4 and which is received in an appurtenant seat in the cutter head, is plane.

The countersink 9 is defined by a plane surface, which is indicated by the fact that the dimension C given in FIG. 3 is constant all over the countersink 9. Said dimension C should preferably be approximately 20% of the radius of curvature of the convex contact surfaces 5, 7.

The support pad 1/guide bar 3 is also provided with a through hole 10 for the receipt of a screw (not shown), by means of which the support pad 1/guide bar 3 is anchored in the appurtenant seat of the cutter head.

As is most clearly seen in FIG. 3, the support pad 1/guide bar 3 is provided with chamfers 6, 8 at the short ends thereof. In that connection, the chamfers 6, 8 are so formed that their fitting against the cutter head in FIG. 1 takes place without there being any level difference between the chamfers 6, 8 and the portions of the cutter head 1 which said chamfers 6, 8 fit against.

In the embodiment illustrated, the support pad 1/guide bar 3 is, on the long sides thereof, provided with projections 11, which in planar view have the shape of segments of a circle. Said projections 11 are intended to cooperate with recesses in the seats, said recesses, in planar view, having a shape corresponding to the projections 11. Thus, the projections 11 fix the support pad 1/guide bar 3 in the longitudinal direction L thereof when the support pad 1/guide bar 3 is situated in the appurtenant seat thereof. In this connection, it should be pointed out that projections 11 in no way are necessary or constitute a presumption for the features, which define the present invention. Thus, it is fully possible within the scope of the present invention that the support pad/guide bar is not provided with projections 11.

In FIG. 5, a part of the support pad 1/guide bar 3), which is encircled in FIG. 4, is shown on a larger scale. For the surface 12, the dimensions of which are indicated in FIG. 5, the given dimension D should be in the interval 0.1–1.0 mm. If the dimension D in question for said surface 12 exceeds 1 mm, there is a risk that particles may press in between the contact surface 5, 7 and the hole wall. The surface 12 should preferably be softly rounded.

The dimension A, see FIG. 4, of the countersink 9 is dependent of the dimension D of the surface 12. If the given dimension D of the surface 12, the dimensions of which are listed, increases the dimension A decreases correspondingly while if the given dimension D of the surface 12 decreases, the dimension A increases correspondingly. It has been established that the angle B in FIG. 4 formed by an extension of the edge 2 and the longitudinal direction L should have the value 55°±10°.

The function of the support pad 1/guide bar 3 described in FIGS. 2–5 is the following. When the deep hole drill on which said support pad 1/guide bar 3 is mounted rotates, said support pad I/guide bar 3 moves in the direction of the arrow P in FIG. 4. In that connection, the upper contact surface 5 in FIG. 4 will be the surface that abuts against the hole wall. The lower contact surface 7 in FIG. 4 has, in principle, no active function.

As for the upper, active contact surface 5 in FIG. 4, it is the left part thereof in FIG. 4 which constitutes the active part of the upper contact surface 5, i.e., said active part abuts against the hole wall.

During drilling with the deep hole drill, cooling medium, commonly oil, is supplied in the axial direction of the drill, at least one part of said cooling medium flows on the outside of the cutter head and reaches the free end of said cutter head, i.e. where the chip removing machining is carried out. In this connection, it should be pointed out that the cutter head of the deep hole drill illustrated in FIG. 1 is provided with axial channels C for the cooling medium. However, this is not necessary in connection with the support pad 1/guide bar 3 according to the present invention but said support pad 1/guide bar may also be mounted on a cutter head which lacks special external channels for the cooling medium.

Thanks to the fact that the cutter head rotates in respect to the workpiece, i.e. the support pad 1/guide bar 3 moves in the direction of the arrow P in FIG. 4, cooling medium will flow in the countersink 9 in the direction of the arrow S. Thanks to the countersink 9 having a diagonal extension, alternatively that the upper contact surface 5 is triangular, the cooling medium will pass near the left part of said upper contact surface 5. i.e. the active part of the contact surface 5. This ensures that there will be good cooling of said active part of the upper contact surface 5, which to a significant degree reduces the occurrence of cracks.

When the upper contact surface 5 in FIG. 4 is worn out, the support pad 1/guide bar 3 is indexed 180°+, i.e. the lower contact surface 7 in FIG. 4 assumes the location of the upper contact surface 5 in FIG. 4. Said indexing is prior art, i.e. nothing specifically for the present invention.

The above described chamfers 6, 8 have the function when the aim is to bore a hole which is through a workpiece, the cutter head according to FIG. 1 will proceed past the bored-through end of the workpiece. Then, when the cutter head according to FIG. 1 is to be retracted through the workpiece after final drilling, it happens, when support pads/guide bars with a design according to prior art are used, that an edge of said support pads/guide bars becomes fastened in the workpiece. In order to avoid that this happens, the support pad/guide bar is provided with said chamfer 6, 8, which means that the cutter head may be retracted through the workpiece without there being any risk that the support pad/guide bar should fasten in the workpiece.

In this connection, it should be pointed out that in the function description made above it has been assumed that the cutter head rotates and that the workpiece is stationary. However, the support pad/guide bar according to the present invention may also be used in the case when the cutter head is stationary and the workpiece rotates. According to an additional alternative, it is feasible that both the cutter head and the workpiece rotate, but in opposite direction.

Figure 6:
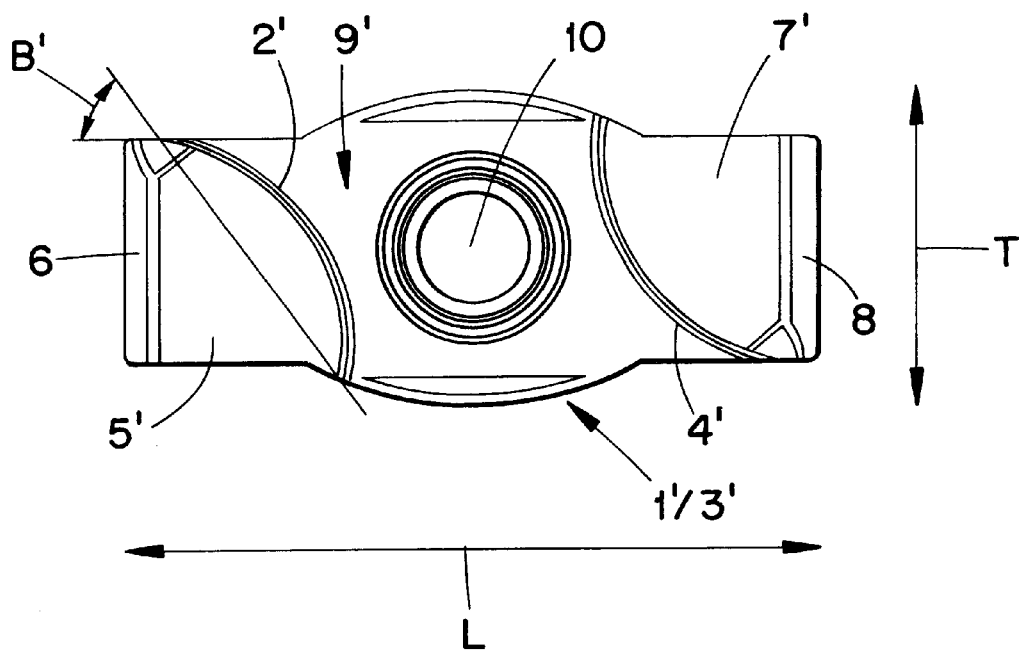
FIG. 6 shows a planar view of an alternative embodiment of a support pad/guide bar according to the present invention.
Figure 7:
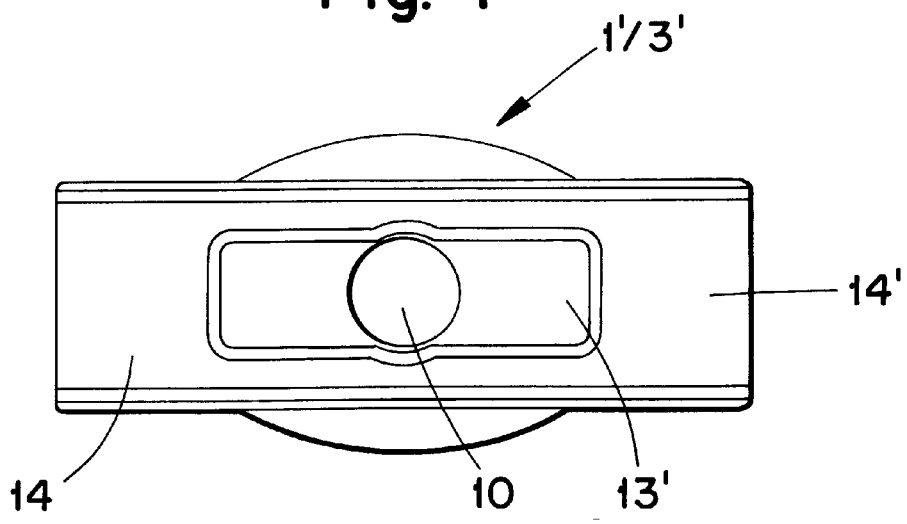
FIG. 7 shows a view from below of the support pad/guide bar according to FIG. 6.

The support pad 1'/guide bar 3' illustrated in FIGS. 6 and 7 has the same basic shape in planar view as the support pad 1/guide bar 3 according to FIGS. 2–5 and it is intended to be mounted in a cutter head according to FIG. 1 in the corresponding way as the support pad 1/guide bar 3) according to FIGS. 2–5. Thus, the support pad 1'/guide bar 3' has a longitudinal direction L along a long side of the support pad 1'/guide bar 3' and a cross-direction T along a short side of the support pad 1'/guide bar 3'.

The contact surfaces 5', 7' of the support pad 1'/guide bar 3' according to FIG. 6 consist of convex surfaces, which are situated on both sides of the hole 10 in the longitudinal direction of the support pad 1'/guide bar 3'. As for the bending radius of said convex contact surfaces 5', 7' in relation to the bending radius of the cutter head, reference is made to what has been said in association with the embodiment according to FIGS. 2–5.

As may be seen in FIG. 6, the limiting edge 2', 4', turned towards the hole 10, for the contact surfaces 5', 7' has a curved shape, said limiting edge 2', 4' bellying towards the hole 10, i.e. it is convex in respect of said contact surfaces 5', 7'. The convex bending of the limiting edge 2', 4' ensures that the contact surfaces 5', 7' relatively seen are larger than the contact surfaces 5, 7 of the support pad 1/guide bar 3 according to FIGS. 2–5. In order to define an angle B' of the support pad 1'/guide bar 3' which corresponds to the angle B of the support pad 1/guide bar 3, a line has been drawn through the end points of the limiting edge 2', see FIG. 6. What has been said above concerning the size of the angle B is also valid for the angle B'.

As for the function of the support pad 1'/guide bar 3' illustrated in FIG. 6, the same is correspondingly valid as for the support pad 1/guide bar 3 according to FIGS. 2–5 that only the contact surface 5', 7' situated closest to the chip removing end of the cutter head is the active contact surface, and that only an active part of said active contact surface abuts against the hole wall.

The support pad 1'/guide bar 3' is, in the corresponding way as the support pad 1/guide bar 3 according to FIGS. 2–5, indexable, i.e. when one of the contact surfaces, for instance 5', is worn out, the support pad 1'/guide bar 3' is indexed so that the contact surface 7' assumes the location of the upper contact surface 5'.

As for the function of the chamfers 6, 8, reference is made to what has been said above in connection with the embodiment according to FIGS. 2–5.

As may be seen in FIG. 7, the support pad 1'/guide bar 3' is, on the underside thereof, provided with a central countersink 13', whereby a frame 14' is formed around said countersink 13', which frame abuts against the bottom of the seats which the support pad 1'/guide bar 3' is received in when it is mounted on a cutter head of a deep hole drill, see FIG. 1. Thanks to the design of a frame 14', it is guaranteed that abutment against the bottom of the seat takes place in the area of the contact surfaces 5', 7' situated on the opposite side of the support pad 1'/guide bar 3', and not in a central area of the support pad 1'/guide bar 3'. What has been said above concerning the abutment of the support pad 1'/guide bar 3' against the bottom of the seat is also valid for the support pad 1/guide bar 3 according to FIGS. 2–5 as well as other feasible embodiments of the present invention.

FEASIBLE MODIFICATIONS OF THE INVENTION

In the above described embodiments of the support pad 1; 1'/guide bar 3; 3', this is provided with a through hole 10 for receipt of a screw or the like for anchorage of the support pad 1; 1'/guide bar 3; 3'in the appurtenant seat thereof. However, within the scope of the present invention, it is feasible that the support pad/guide bar is of the type that is connected by soldering to the cutter head, i.e. it is not necessary that the support pad/guide bar has a through hole for the anchorage thereof in the seat.

What is claimed is:

1. An element adapted to be mounted in a seat of a cutter head of a deep hole drill for defining at least one of a support pad and a guide bar, the element comprising a body defining a longitudinal direction and cross-direction, the body including an inner-mounting side and an opposing outer side, the outer side including:

a contact surface adapted to engage a wall of a hole being drilled, and a countersink extending across the outer side in a direction transversely of the longitudinal direction, wherein an edge of the contact surface facing toward a center of the body forms an angle with the longitudinal direction in the range of 55°±10°.

2. The element according to claim 1 wherein the contact surface constitutes a first contact surface, the outer surface further including a second contact surface, the first and second contact surfaces being disposed at respective ends of the outer surface and spaced apart in the longitudinal direction, the first and second contact surfaces being of convex configuration as viewed in a direction parallel to the cross-direction and perpendicular to the longitudinal direction, the countersink situated between the first and second contact surfaces.

3. The element according to claim 2 wherein the countersink is defined by a plane surface.

4. The element according to claim 2 wherein the outer surface includes opposite ends spaced apart in the longitudinal direction, the length of the body in the longitudinal direction being greater than a width of the body in the cross-direction, each of the opposite ends being chamfered.

5. The element according to claim 2 wherein the inner and outer surfaces are interconnected by long sides extending in the longitudinal direction, and by short sides extending in the cross-direction, wherein intersections of the long sides with the short sides are chamfered.

6. The element according to claim 2 wherein the edge of the contact surface is substantially straight as viewed in a direction perpendicular to the outer surface.

7. The element according to claim 2 wherein the edge of the contact surface is convex as viewed in a direction perpendicular to the outer surface.

8. The element according to claim 3 which constitutes a support pad.

9. The element according to claim 3 which constitutes a guide bar.

10. A deep hole drill comprising a body having a cutting head defining a longitudinal axis and including a generally cylindrical outer periphery; a support pad and a guide bar mounted in the outer periphery; each of the support pad and the guide bar comprising a body defining a longitudinal direction oriented substantially parallel to the axis, and a cross direction oriented perpendicular to the longitudinal direction; the body including an inner side engaging the outer periphery, and an outer side facing radially away from the outer periphery, the outer side including:

a contact surface adapted to engage a wall of a hole being drilled, and a countersink extending across the outer side in a direction transversely of the longitudinal direction, wherein an edge of the contact surface facing toward a center of the body forms an angle with the longitudinal direction in the range of 55°±10°.

* * * * *